No. 668,779. Patented Feb. 26, 1901.
N. H. SUREN.
APPARATUS FOR CONTROLLING CONNECTIONS OF STORAGE BATTERIES WITH CHARGING CIRCUITS.
(Application filed June 29, 1899.)
(No Model.) 2 Sheets—Sheet 1.

Witnesses:
H. B. Davis.
J. L. Hutchinson.

Inventor:
Nathan H. Suren
by B. Jelyles,
Atty.

No. 668,779. Patented Feb. 26, 1901.
N. H. SUREN.
APPARATUS FOR CONTROLLING CONNECTIONS OF STORAGE BATTERIES WITH CHARGING CIRCUITS.
(Application filed June 29, 1899.)
(No Model.) 2 Sheets—Sheet 2.

Witnesses:
H. B. Davis
J. L. Hutchinson

Inventor:
Nathan H. Suren
by B. J. Noyes,
Atty.

UNITED STATES PATENT OFFICE.

NATHAN H. SUREN, OF NEEDHAM, MASSACHUSETTS.

APPARATUS FOR CONTROLLING CONNECTIONS OF STORAGE BATTERIES WITH CHARGING-CIRCUITS.

SPECIFICATION forming part of Letters Patent No. 668,779, dated February 26, 1901.

Application filed June 29, 1899. Serial No. 722,251. (No model.)

*To all whom it may concern:*

Be it known that I, NATHAN H. SUREN, of Needham, county of Norfolk, and State of Massachusetts, have invented an Improvement in Apparatus for Controlling the Connections of Storage Batteries with a Charging-Circuit, of which the following description, in connection with the accompanying drawings, is a specification, like characters on the drawings representing like parts.

It is now customary in many places to use storage batteries for fire-alarm and other circuits and to charge the same at proper times, and a switchboard having suitable switches, by means of which the electric connections are made, is employed.

In other applications for Letters Patents, Serial No. 721,151, filed June 19, 1899, and Serial No. 722,287, filed June 29, 1899, means are shown for controlling the electric connections between the storage-battery terminals and the charging-circuit, such means comprising a number of magnets, and the charging-current passes through the coils of these magnets, and as it frequently happens that different charging-currents are utilized, some of high tension and small amperage and some of low tension and large amperage, it therefore becomes necessary that these magnets shall be capable of operation without injury with these different charging-currents; and this invention has for its object to provide means whereby such results may be accomplished.

The invention consists in a charging-circuit, a storage battery adapted to be connected therewith, and means for controlling the connections of said storage battery with said charging-circuit, comprising a number of magnets, through the coils of which the charging-current passes, and switches for connecting the coils of said magnets in different ways with the charging-circuit—as, for instance, for connecting them in series or multiple series or in parallel with the charging-circuit.

Figure 1:
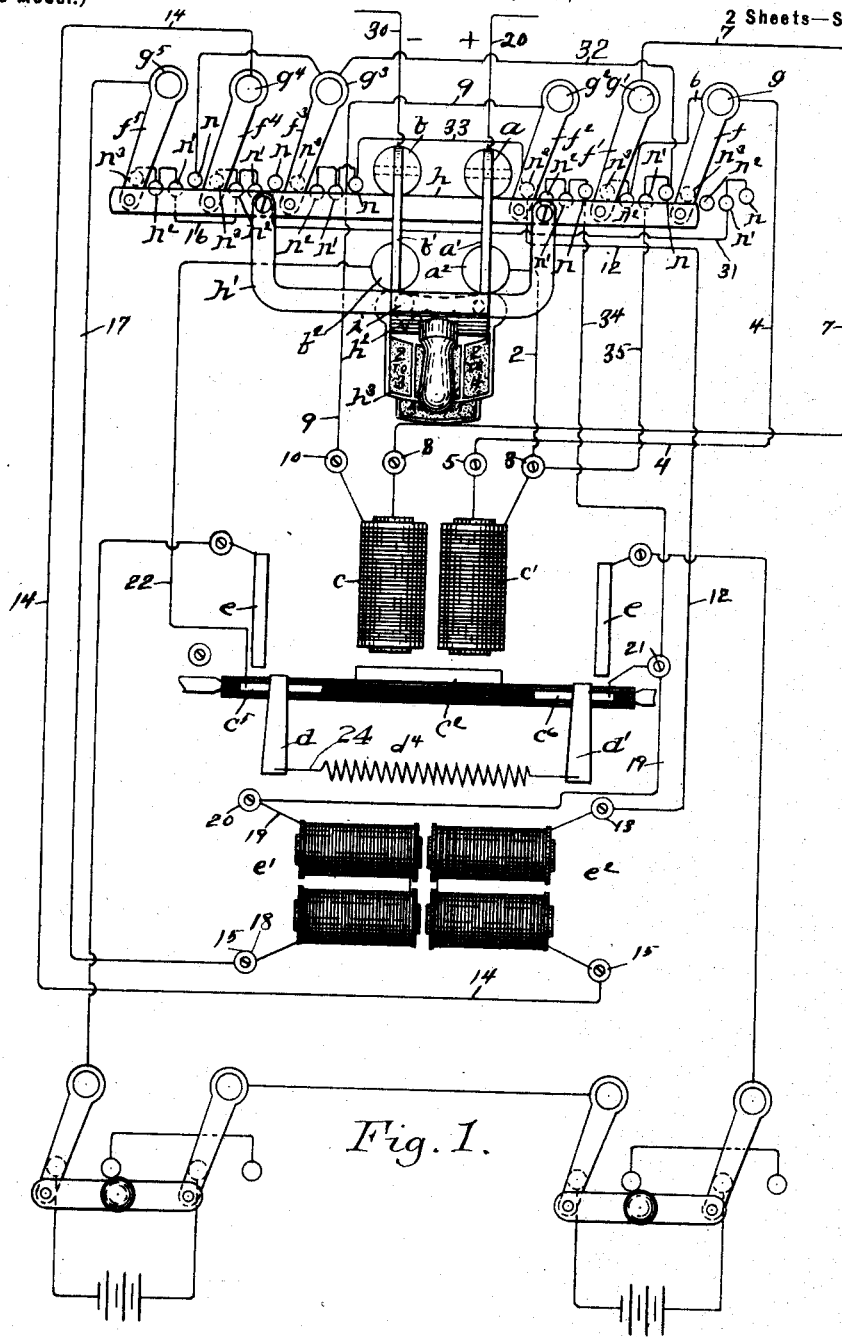
Figure 2:
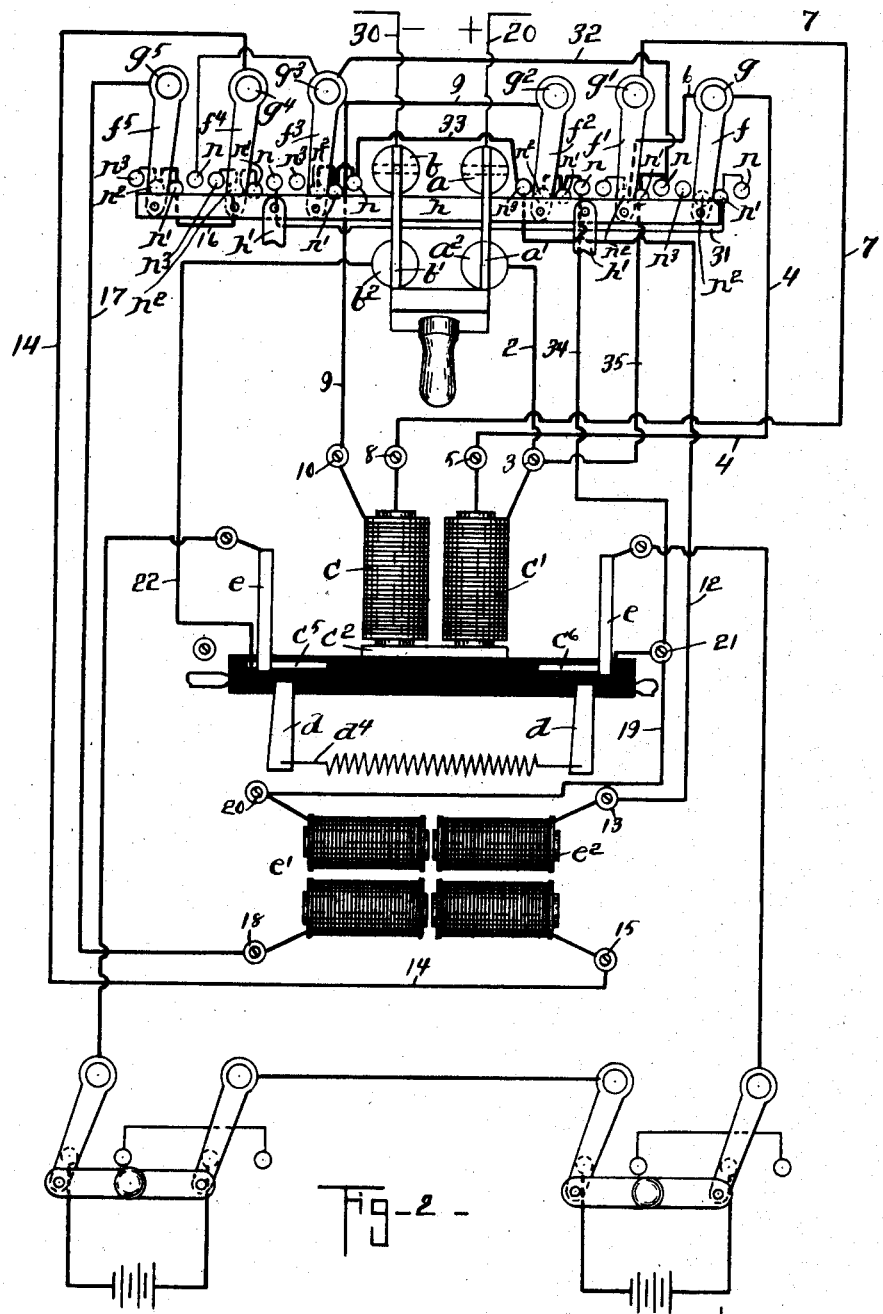

Figure 1 represents in diagram means for connecting a storage battery with a charging-circuit and means for controlling said connections and means embodying this invention for adapting said means to be operated without injury with different charging-currents, whereby a standard switchboard may be manufactured and sold, the switches being disposed to connect the several magnet-coils in series; and Fig. 2, a similar diagram showing the switches disposed to connect the magnet-coils in multiple series, two magnet-coils being in each branch.

20 30 represent the charging-circuit wires connected to the pivot-posts $a$ $b$ of an ordinary knife-switch, the switch-arms $a'$ $b'$ of which are pivoted to said posts $a$ $b$ and are adapted to engage the posts $a^2$ $b^2$ to close the switch.

$c$ $c'$ represent the coils of an electromagnet, the armature $c^2$ of which has on its front edge two metallic strips $c^5$ $c^6$, insulated from each other, and when the said armature is retracted said strips $c^5$ $c^6$ will respectively engage the contact-springs $d$ $d'$ and when attracted will engage the battery-terminals $e$. The contact-springs $d$ $d'$ are connected together by a circuit-wire $d^4$, which may and preferably will include a suitable resistance.

The object of the loop-circuit and contacts $d$ $d'$ is to make the board automatic in respect to the battery.

When the knife-switch is closed, the coils $c$ and $c'$ of the electromagnet are included in the charging-circuit, and its armature will be immediately attracted, and consequently the battery-terminals $e$ will be connected with the charging-circuit. This means of connecting a storage battery with a charging-circuit is shown in my application for Letters Patent Serial No. 722,287.

$e'$ $e^2$ represent two pairs of coils of a polarized electromagnet, which are disposed so as to face each other, and the permanently-magnetized armature is pivoted between them. The coils of this polarized electromagnet are also included in the charging-circuit when the knife-switch is closed.

The polarized electromagnet is employed for the purpose of operating suitable devices to open the knife-switch, and thereby disconnect the storage battery from the charging-circuit, if the latter should not be connected in correct polarity. The polarized electromagnet and the means for operating it to accomplish this result form the subject-matter of my application for Letters Patent, Serial No. 721,151, filed June 19, 1899. It will therefore be seen that the charging-current must pass through all of the coils of said magnets in order that they may accomplish the results intended for them, and consequently they are liable to injury if the charging-current should be too strong. If, however, the said coils should be connected with the charging-circuit in different ways—as, for instance, in series or in multiple series or in parallel with the charging-circuit—I find that they will be capable of carrying any of the different charging-currents without injury. To accomplish this result, a set of switches are provided, which are herein represented as a number of switch-arms $f$ $f'$ $f^2$ $f^3$ $f^4$ $f^5$, pivoted to their respective posts $g$ $g'$ $g^2$ $g^3$ $g^4$ $g^5$, and four ordinary anvil or other form of contacts are provided for each switch-arm, as $n$ $n'$ $n^2$ $n^3$, and all of said switch-arms are connected together by a rod or bar $h$, so as to be moved together, and a bracket $h'$ is secured to said rod or bar, having a projection $h^5$, which coöperates with a suitable index-plate $h^3$. A thumb-screw $i$ is provided, by means of which the bracket may be secured to the index-plate in several different positions, four being herein shown, and as the bracket is thus moved the switch-arms will be caused to engage the different anvil-contacts. As these switch-arms are simultaneously operated the coils of the magnets will be connected in four different ways with the charging-circuit—as, for instance, in one position all of the coils will be connected in series, in another position two of the coils will be connected in series with each other, two paths being provided for the current, in another position three paths will be provided for the current and the coils correspondingly arranged, one in each of two of the paths and two in the other path, and in another position all of the coils will be arranged in parallel—that is, in separate paths. The circuit-wires when arranged to enable the switches to thus connect the coils of the magnets may be as follows: Referring to Fig. 1, the wire 2 connects the post $a^2$ of the knife-switch with the terminal 3 of the coil $c'$, the wire 4 leads from the terminal 5 of said coil to the pivot-post $g$, the wire 6 leads from said pivot-post $g$ to the contacts $n^2$ $n^3$ of the switch-arm $f'$, the wire 7 leads from the pivot-post $g'$ of said switch-arm $f'$ to the terminal 8 of the coil $c$, the wire 9 leads from the terminal 10 of the coil $c$ to the pivot-post $g^2$, the wire 12 leads from the contact $n^3$ of the switch-arm $f^2$ to the terminal 13 of the pair of magnet-coils $e^2$ of the polarized electromagnet, the wire 14 leads from the terminal 15 of said pair of coils $e^2$ to the pivot-post $g^4$, the wire 16 leads from the contacts $n'$, $n^2$, and $n^3$ of the switch-arm $f^4$ to the contacts $n'$ $n^2$ $n^3$ of the switch-arm $f^5$, the wire 17 leads from the pivot-post $g^5$ to the terminal 18 of the other pair of magnet-coils $e'$, the wire 19 leads from the other terminal 20 of said pair of coils $e'$ to the terminal 21, connected to the metallic strip $c^6$, which bears upon or engages the contact-spring $d'$, which is connected by wire $d^4$ with the other contact-spring $d$, bearing upon the metallic strip $c^5$, and the wire 22 leads from said metallic strip $c^5$ to the post $b^2$ of the knife-switch. When the switches are thrown to the left, as represented in Fig. 1, all of the switch-arms will bear upon their contacts $n^3$ and the coils of the several magnets will all be in series, and the circuit may be traced as above described. A wire 31 connects the contacts $n$ and $n'$ of the switch-arm $f$ with the contact $n$ of the switch-arm $f^4$, a wire 32 connects the contact $n$ of the switch-arm $f'$ with the pivot-post $g^3$ and contact $n$ of the switch-arm $f^5$, a wire 33 connects the contact $n^3$ of the switch-arm $f^2$ with the contacts $n$ $n'$ $n^2$ of the switch-arm $f^3$, a wire 34 connects the contacts $n$ $n'$ $n^2$ of the switch-arm $f^2$ with the terminal 21, and a wire 35 connects the contacts $n$ $n'$ of the switch-arm $f'$ with the terminal 3. By moving the switch-arms into the other three different positions, so that they will engage the contacts $n$ or $n'$ or $n^2$, the several magnet-coils will be connected with the charging-circuit in the other three different positions referred to. This will enable the operator to charge the batteries at several different rates and keep the magnets protected by putting them in proper form for the amount of current passing through them and still enable them to retain sufficient energizing power to attract their armatures.

Referring to Fig. 2, the switch-arms are moved into position to rest upon the several contacts $n^2$ and two paths for the current will be provided, and the circuits may be traced as follows: $a^2$, 2, 3, $c'$, 5, 4, $g$, 6, $n^2$, $f'$, $g'$, 7, 8, $c$, 10, 9, $g^2$, $f^2$, $n^2$, $n'$, $n$, 34, 21, $c^6$, battery-terminal $e$, through wires and storage batteries to the other battery-terminal $e$, $c^5$, 22, $b^2$, thereby including two of the coils $c$ and $c'$ in series in one branch of the circuit, and from the terminal 3, 35, $n'$, $n$, 32, $g^3$, $f^3$, $n^2$, $n'$, $n$, 33, $n^3$, 12, 13, $e^2$, 15, 14, $g^4$, $f^4$, $n^2$, 16, $n'$, $n^2$, $f^5$, $g^5$, 17, 18, $e'$, 20, 19, 21, thence returning to the post $b^2$ by $c^6$, $e$, $e$, $c^5$, and 22, thereby including the other two coils $e'$ $e^2$ in series in the other branch of the circuit.

I claim—

1. A charging-circuit, a storage battery adapted to be connected therewith and means for controlling the connections comprising a number of magnets, and switches for connecting the coils of said magnets with said charging-circuit in series with themselves or in parallel with each other, substantially as described.

2. A charging-circuit, a storage battery adapted to be connected therewith and means for controlling the connections comprising a number of magnets and switches for connecting the coils of said magnets with said charging-circuit, in series or in multiple series with themselves, or in parallel with each other, substantially as described.

In testimony whereof I have signed my name to this specification in the presence of two subscribing witnesses.

NATHAN H. SUREN.

Witnesses:
B. J. NOYES,
J. L. HUTCHINSON.